United States Patent [19]
Butke

[11] Patent Number: 5,255,724
[45] Date of Patent: Oct. 26, 1993

[54] ADJUSTABLE EXTENSION ASSEMBLY

[76] Inventor: Gregory F. Butke, 322 W. South Park Ave., Oshkosh, Wis. 54901

[21] Appl. No.: 975,053

[22] Filed: Nov. 12, 1992

[51] Int. Cl.[5] ............................ B27C 9/02; B25H 1/04
[52] U.S. Cl. ........................................ 144/329; 83/574;
83/859; 108/33; 108/65; 108/71; 144/1 R;
144/114 R; 144/286 A; 144/287
[58] Field of Search ............................ 83/13, 574, 859;
108/28, 33, 65, 69, 71, 79, 92, 97, 101, 147, 150;
144/1 R, 3 R, 114 R, 117 R, 129, 286 R, 286 A,
287, 329

[56] References Cited

U.S. PATENT DOCUMENTS

| | | |
|---|---|---|
| 1,864,840 | 6/1932 | Lehner . |
| 2,584,196 | 2/1952 | Fernandes . |
| 3,307,814 | 3/1967 | Bogar, Jr. . |
| 4,106,381 | 8/1978 | Kreitz . |
| 4,248,115 | 2/1981 | Brodbeck et al. ............... 144/287 |
| 4,341,247 | 7/1982 | Price ................................. 144/287 |
| 4,561,336 | 12/1985 | Davis . |
| 4,565,263 | 1/1986 | Southworth . |
| 4,830,076 | 5/1989 | Feyer . |
| 4,874,025 | 10/1989 | Cleveland . |
| 4,934,423 | 6/1990 | Withrow . |
| 5,004,029 | 4/1991 | Garner . |
| 5,011,104 | 4/1991 | Fang . |
| 5,105,862 | 4/1992 | Skinner et al. ................... 144/287 |

Primary Examiner—W. Donald Bray
Attorney, Agent, or Firm—Nilles & Nilles

[57] ABSTRACT

An extension assembly increases the safety of bench or table-type machines without significantly reducing the mobility of the machines. The extension assembly includes an extension table, rigidly connected to a support surface of the machine, and a longitudinally adjustable support element connecting the extension table to the body of the machine. A self-adjust mechanism is provided which facilitates adjustment of the extension table of the extension assembly upon adjustment of the support surface. The self-adjust mechanism preferably includes a spring biasing inner and outer telescoping tubes of the extension assembly. Leveling assemblies may be mounted on the machine to increase its stability.

19 Claims, 6 Drawing Sheets

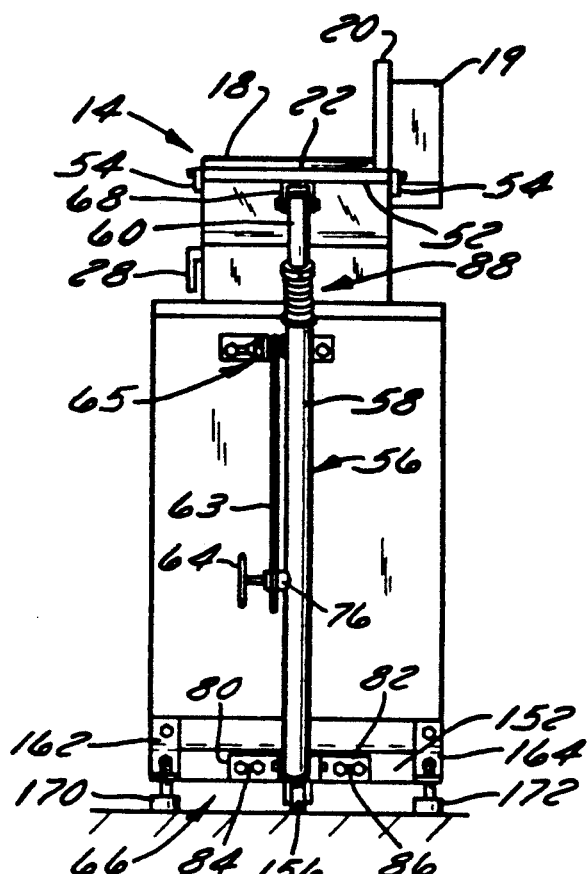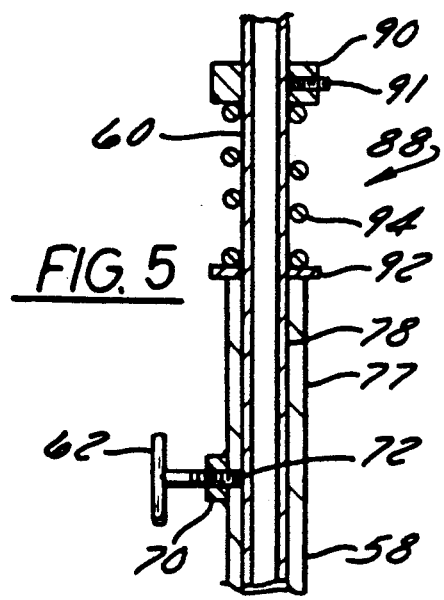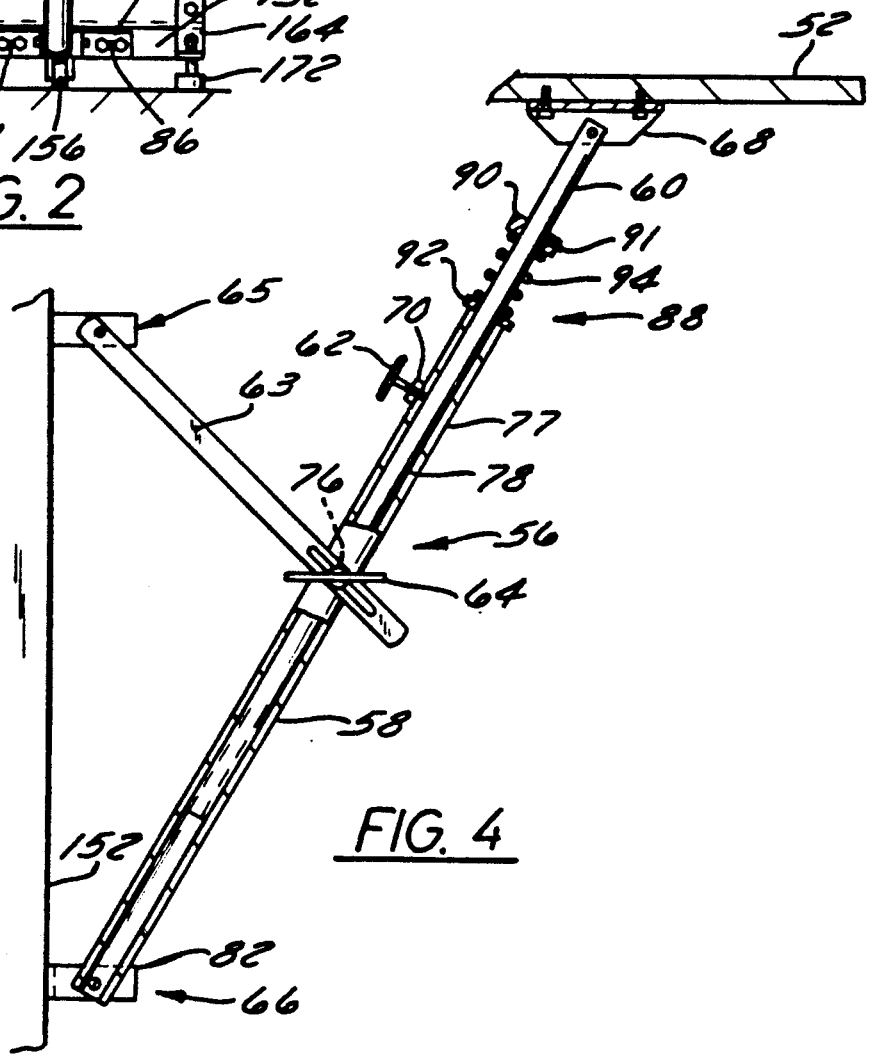
FIG. 2
FIG. 5
FIG. 4

ADJUSTABLE EXTENSION ASSEMBLY

BACKGROUND OF THE INVENTION

1. Field of the Invention

The invention relates to extension assemblies and, more particularly, relates to adjustable extension assemblies for support surfaces which can be adjusted with respect to the tool on which they are mounted.

2. Discussion of the Related Art

Various bench or table-type machines such as jointers, planers, drill presses, overhead shapers, mortisers, band saws, scroll saws, etc. employ infeed and outfeed surfaces for facilitating the introduction and withdrawal of work pieces to and from the work area and/or support surfaces for supporting the work piece in the work area. It is often necessary to vertically or horizontally adjust the position of such surfaces with respect to the remainder of the machine to adjust the operational parameters of the tool and/or to assure proper operation of the tool. For example, the infeed tables of jointers and planers often are vertically adjustable to increase or decrease the cutting or planing stroke and/or to properly align a support surface with the cutting or planing tool. Similarly, the support tables of drill presses may be adjustable to accommodate varying press strokes.

These infeed and outfeed surfaces and support surfaces often suffer the disadvantage of being insufficiently long to adequately accommodate relatively long work pieces. For instance, the infeed table of the typical jointer is only a few feet long and yet is used to prepare for planing boards which are twelve feet long or even longer. As a result, the operator must manually balance the board on the infeed table while at the same time feeding the board into the machine, thus increasing the chances that the board will not be inserted into or withdrawn from the machine under the proper balancing forces or at the proper angle. This in turn increases the risk that the board will be rapidly jerked into the machine by the cutting blade or that the cutting blade will kick the board away from the machine. In either case, the chances of damage to the board and/or injury to the operator are greatly increased.

To overcome these disadvantages, various devices have been proposed which extend the effective length of the infeed and/or outfeed tables or support surfaces of such machines. However, the typical extension assembly tends to be very complex, is difficult to adjust, decreases the mobility of the machine on which it is mounted, and/or provides insufficient rigidity to support the weight of relatively heavy work pieces. Such devices are also typically employed without providing any additional supports or stabilizers for the machine.

For example, U.S. Pat. No. 4,830,076, which issued to Feyer on May 16, 1989, proposes the connection of an extension table to an adjustable outfeed table of a planer via a large wedge-shaped element which is supported directly on the floor and which is connected to the outfeed table by a complicated fulcrum and pivot rod arrangement. This arrangement is relatively complex and is thus expensive and time consuming to assemble and is also prone to failure. In addition, since both the fulcrum and the wedge-shaped body are supported directly on the floor, movement of the entire assembly is relatively difficult. Finally, no devices are employed to increase the stability or mobility of the machine.

OBJECTS AND SUMMARY OF THE INVENTION

It is therefore an object of the invention to provide an extension assembly for a support surface of a machine which is simple in construction, which can be easily installed without hampering the mobility of the machine, and which is also rugged and strong.

It is another object of the invention to provide an extension assembly for a support surface of a machine which is self-adjusting upon adjustment of the support surface.

It is yet another object of the invention to provide a system for increasing the safety capabilities of the machine by increasing the stability of the machine without decreasing its mobility.

Other objects, features, and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout, and in which:

FIG. 2 is an end view of the device of FIG. 1;

FIG. 4 is a sectional view of a portion of one of the extension assemblies of FIG. 1;

FIG. 5 is an enlarged view of the self-adjust mechanism of the extension assembly of FIGS. 3 and 4;

DETAILED DESCRIPTION OF THE PREFERRED EMBODIMENTS

Resume

Figure 1:
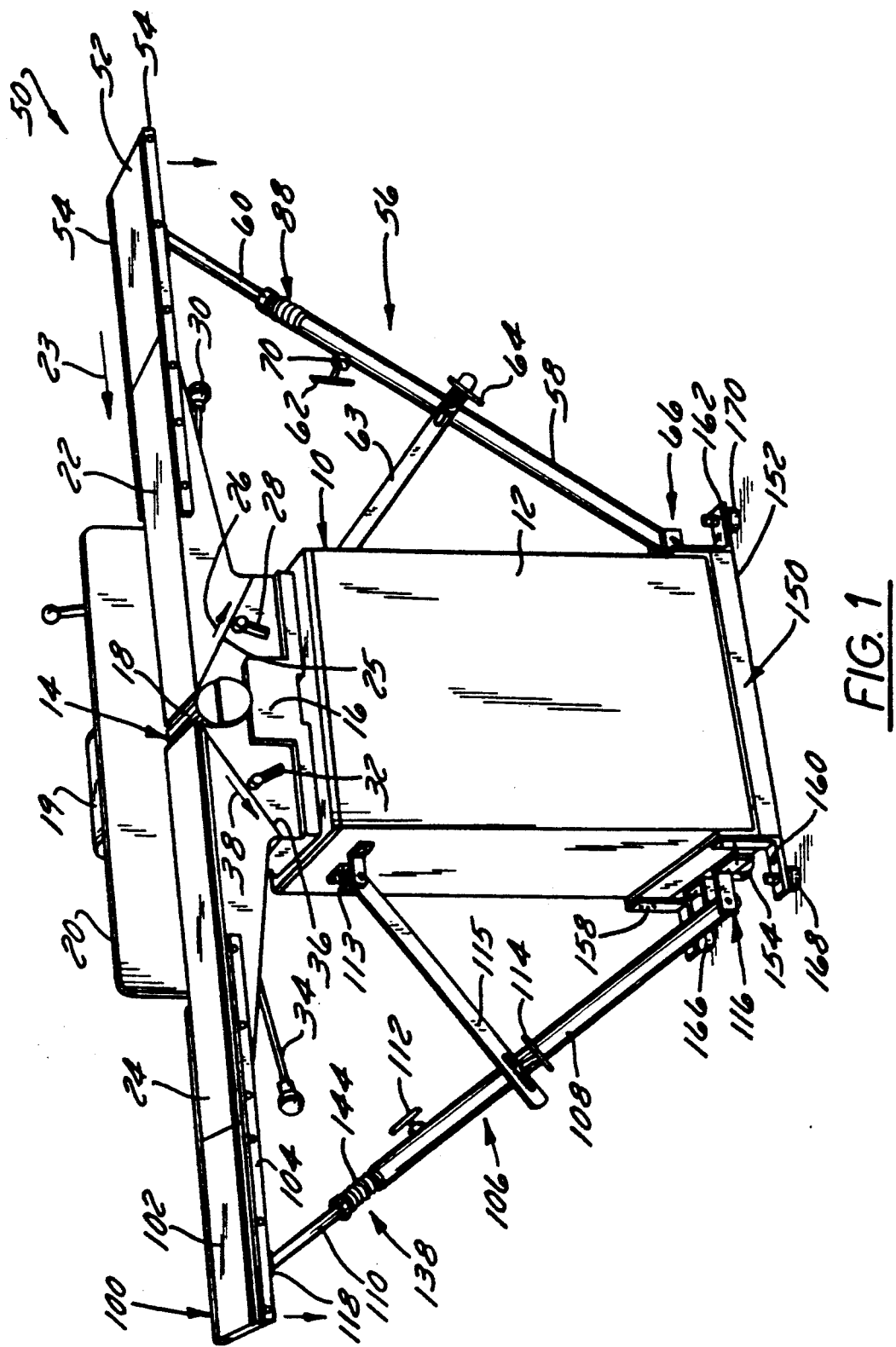
FIG. 1 is a perspective view of a jointer incorporating extension assemblies and a carriage with leveling assemblies constructed in accordance with the present invention.
Figure 3:
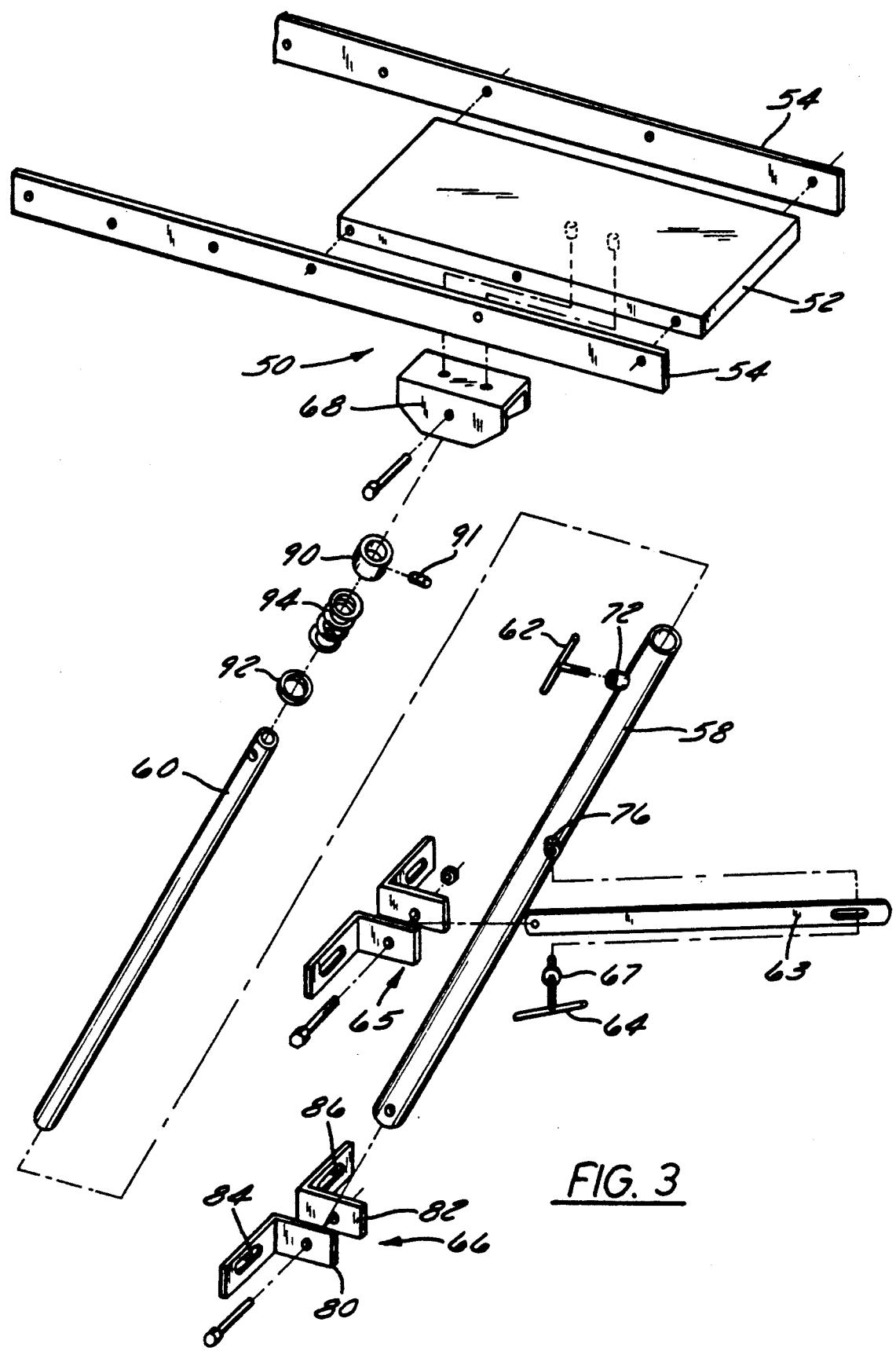
FIG. 3 is an exploded view of one of the extension assemblies of FIG. 1.
Figure 6:
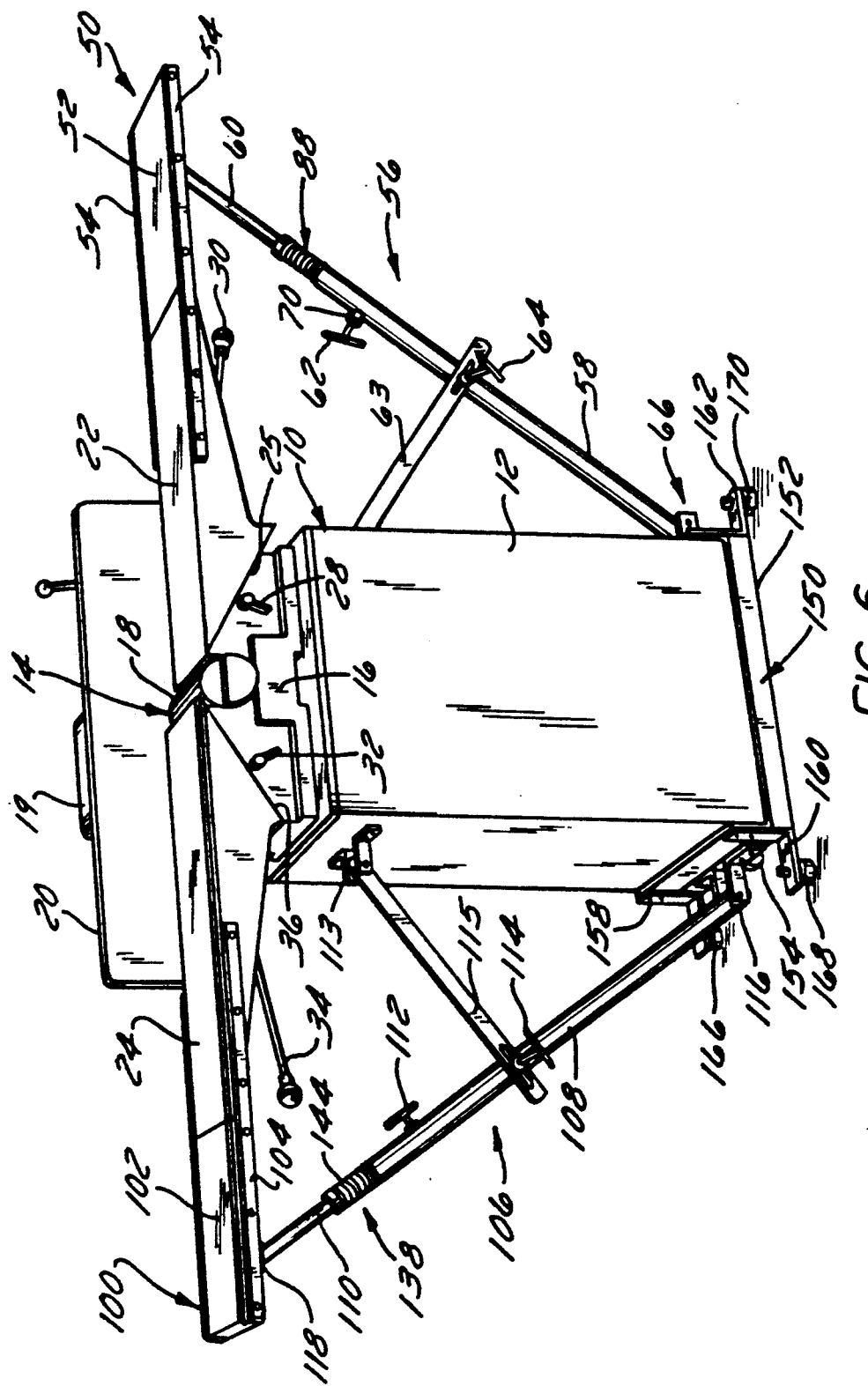
FIG. 6 illustrates the jointer of FIG. 1 with one of the extension assemblies being moved to an adjusted position.

Pursuant to the invention, an extension assembly is provided which increase the safety of bench or table-type machines without significantly reducing the mobility of the machines. The extension assembly includes an extension table rigidly connected to a support surface of the machine, and a longitudinally adjustable support element connecting the extension table to the body of the machine. A self-adjust mechanism is provided which facilitates adjustment of the extension table upon adjustment of the support surface. Leveling assemblies may be mounted on the machine to increase its stability.

First Embodiment

Referring to FIGS. 1-6, a jointer 10 is illustrated which is fitted with extension assemblies 50 and 100 and a carriage 150 having leveling assemblies constructed in accordance with the present invention. The jointer 10 includes a pedestal 12 serving as a frame for jointer 10 and having a cutting tool 14 mounted thereon. The cutting tool 14 includes a base 16, a rotary blade 18 driven by a motor 19, mounted on a longitudinal center of the base 16 and extending transversely across the base 16, a vertical guide plate 20, and infeed and outfeed tables 22, 24 serving as support surfaces for the boards to be serviced.

The jointer 10 removes rough spots, twists, and warps from boards to prepare them for planing. This is achieved by positioning the infeed table 22 below the outfeed table 24 and the cutting surface of blade 18 and by transporting the boards across the infeed table 22, over the blade 18, and over the outfeed table 24 in the direction of arrow 23 in FIG. 1. Depending upon the severity of the twisting, warpage, etc. and on the criticality of minimizing the depth of the cut performed by the blade 18, it may be necessary to adjust the height of the infeed table 22 relative to the outfeed table 24. The height of infeed table 22 is adjusted by loosening a butterfly screw 28 locking the infeed table 22 to the base 16 and by rotating a quick change lever 30 to slide the infeed table 22 along a gib joint 25 in the direction of arrow 26 in FIG. 1 in a manner which is, per se, well known. Table 22 is then locked in position again by tightening butterfly screw 28.

It may also be necessary to adjust the height of outfeed table 24 relative to the blade 18 so that the top surface of outfeed table 24 is coplanar with the cutting plane defined by the blade 18. This height adjustment is performed by loosening butterfly screw 32 and actuating a quick-change lever 34 to slide the outfeed table 24 along a gib joint 36 in the direction of arrow 38 in FIG. 1.

Pursuant to the invention, extension assemblies 50 and 100 are provided on the infeed and outfeed tables 22, 24 to facilitate the balancing of boards on the support surfaces formed by tables 22, 24. These extension assemblies comprise extension tables 52, 102 rigidly connected to the tables 22 and 24 by connecting bars 54 and 104 and supported by longitudinally adjustable support elements 56, 106. Each extension table 52, 102 preferably is formed of a rigid metal plate having a first end positioned coplanar with and connected to the respective infeed or outfeed table 22, 24 and a second end spaced 12" to 16" or more from the end of the respective infeed or outfeed table. The widths of the extension tables 52, 102 preferably match those of the infeed and outfeed tables 22, 24 so that the bars 54, 104 can be attached directly to the sides of the tables.

Each of the bars 54, 104 preferably comprises a rigid metal bar having holes bored therethrough which are aligned with holes previously tapped in the tables 22, 52, 24, and 102. In the illustrated embodiments, connecting bars 104 are secured to table 102 with their upper surfaces being positioned beneath the support surface of table 102 in order to permit the formation of rabbit joints on the boards being serviced by jointer 10. The widths of the extension tables 52, 102 could be made variable so as to be useable with different jointer machines. The width could be varied through, e.g., inserting leaves longitudinal into the support tables 52, 102 or by forming the tables out of overlapping plates which can slide relative to one another to present a variable effective surface area. The lengths of tables 52, 102 could also be variable to provide variable extensions.

Each support element 56, 106 is longitudinally adjustable and is pivotable with respect to the jointer and the respective extension table. The upper end of each support element 56, 106 thus moves both horizontally and vertically as the infeed and outfeed tables 22 and 24 slide along gib joints 25 and 36.

Support element 56 includes first and second telescoping tubes 58 and 60 and locking devices including locking pins or screws 62, 64 normally locking the tubes together and selectively permitting movement of the tubes longitudinally of one another. Outer tube 58 has a first end pivotally connected to a support bracket 66 mounted on frame 150. Inner tube 60 has a first end slidably received inside the second end of outer tube 58 and has a second end pivotally connected to a second support bracket 68 mounted on the bottom surface of extension table 52 between its opposed ends.

In the illustrated embodiment, a locking screw 62 is threadedly received in a collar 70 welded or otherwise mounted on the outer surface 77 of outer tube 58. This lock extends through a hole 72 formed in the surface 77 of outer tube 58 and is rotatable into and out of contact with the outer surface 78 of inner tube 60 to selectively lock tubes 58 and 60 relative to one another, thereby preventing relative longitudinal movement. This locking could be facilitated by forming depressions or grooves (not shown) in the outer surface 78 of inner tube 60 for receiving the ends of screw 62. Preferably, the tubes 58 and 60 are machined with relatively close tolerances to prevent pivoting of one with respect to the other and are formed of hardened steel to prevent the formation of burrs, etc. which could hinder relative sliding of the tubes.

A support is preferably provided which connects the support element 56 to the jointer 10 to help prevent unintended lowering of tables 22 and 52, even if the butterfly screw 28 is inadvertently loosened. In the illustrated embodiment, the support includes a flat strut 63 which connects the outer tube 58 of support assembly 56 to pedestal 12. Strut 63 has a first end pivotally connected to the pedestal 12 of jointer 10 by a support bracket 65 and a second end connected to the side of the outer tube 60 by a locking screw 64 which includes a threaded shank having a shoulder 67 formed thereon. The locking screw extends through a slot formed in the second end of strut 63 and threadedly engages a collar 76 disposed on the side of outer tube 60. When screw 64 is tightened, the strut 63 is clamped between the collar 76 and the shoulder 67, thus locking the strut 63 in place and preventing support assembly 56 from pivoting with respect to the base frame 152, thereby preventing adjustment of the outfeed table 22.

Support bracket 66 preferably comprises a pair of mating L-shaped members 80, 82. Each member 80, 82 has a first leg extending coplanar with frame 152 having elongated slots 84, 86 formed therein for connection to holes tapped in a frame 152 of carriage 150 which acts as a base for the jointer 10, and a second leg extending orthogonally from base frame 152 and having a hole formed therein for pivotally receiving the first end of outer tube 58. The slots 84 and 86 permit horizontal adjustment of support bracket 66 for center positioning on jointers and support tables of various widths. Frame 152 of carriage 150 receives the pedestal 12 of jointer 10 and is supported on wheels or rollers 154, 156. The support brackets 66 and 68, as well as the tubes 58 and 60 and the bars 54, 104, should be constructed out of steel or some other rigid material capable of providing stable support under the imposition of relatively heavy loads on the table 52.

Support bracket 65 for strut 63 should be of the same or similar construction as support bracket 66 so as to permit adjustment of strut 63 with support element 56.

A self-adjust mechanism 88 is also provided which supports the weight of the extension table 52 during adjustment of the infeed table 22. In the illustrated embodiment, this self-adjust mechanism includes a collar 90 secured to the inner tube 60 by a screw 91, a washer 92 provided on the outer tube 58, and a counterbalancing spring 94 surrounding the inner tube 58 and engaging the collar 90 and the washer 92. Spring 94 should be very stiff so as to counterbalance the weight of the extension table 52 when the locking screws 62, 64 are loosened. Preferably, the spring constant of spring 94 is directly related to the weight of the extension table 52. The resistance provided by spring 94 should also remain constant throughout the stroke of the inner tube 58 of support element 56. This spring should also be sufficiently long to permit adjustment of the infeed table 22 through its full possible stroke. Spring 94 need not be positioned as illustrated and need not abut a locking washer and collar. For example, the spring could be provided inside outer tube 58 and contact the first or lower end of the inner tube 60. Other self-adjust mechanisms could also be provided instead of or in addition to counterbalancing spring 94.

The infeed table 22 is adjustable with respect to support surface 16 as follows. First, butterfly screw 28 and lock screws 62 and 64 are loosened. At this time, that portion of the weight of extension table 52 not bourn by infeed table 22 will be supported on the counterbalancing spring 94 of self-adjust mechanism 88. Then, the quick change lever 30 is actuated to slide the infeed table 22 downwardly and outwardly along the gib joint 25 in the direction of arrow 26 to move the tables 22 and 52 from the position illustrated in FIG. 1 to that illustrated in FIG. 6. This adjustment is facilitated by virtue of the fact that self-adjust mechanism 88 carries all or nearly all of the weight of table 22 which would otherwise be carried by the gib joint 25, thus relieving most or all of the pressure from the gib joint. This pressure relief also decreases the wear on the gib joint 25, thereby increasing its life. During this movement, tubes 58 and 60 pivot about brackets 66 and 68 and tube 60 telescopes into tube 58 against the action of self-adjust mechanism 88. Strut 65 simultaneously pivots about bracket 63. Butterfly screw 28 and locks 62 and 64 are then tightened again to lock the table 22, the tubes 58 and 60, and the strut 63 in position. The tables 22 and 52 can be raised utilizing the same procedure, with the biasing force of the spring 94 of self-adjust mechanism 88 assisting adjustment.

The extension assembly 100 for the outfeed table 24 is identical to that of the extension assembly 50 and includes support brackets 116 and 118, a support element 106, and a self-adjust mechanism 138. The support element 106 includes outer and inner telescoping tubes 108 and 110 and a lock 112. A strut 115 is pivotally connected to pedestal 12 by a support bracket 113 and is slidably connected to outer tube 108 by a lock 114. The self-adjust mechanism 138 includes a collar provided on inner tube 110, a washer provided on outer tube 108, and a spring 144 surrounding the inner tube and abutting the collar 140 and washer 142. Further description of extension assembly 100 will be omitted to avoid repetition.

A plurality of leveling assemblies are provided on the frame 152, each of which comprises an L-bracket and a leveling pad. L-brackets 158, 160, 162, 164 are provided at the respective corners of the frame 152, extend orthogonally from the frame, and receive leveling pads 166, 168, 170, 172. Each of these leveling pads includes a threaded shank received in a threaded hole formed in the respective L-bracket and a support pad provided on the free end of the shank. Leveling pads 166, 168, 170, 172 can be adjusted such that the support pads rest on the ground by rotating the shanks relative to the L-brackets. If desired, lock nuts (not shown) could be provided on the pads 166, 168, 170, 172 to prevent the pads from loosening under vibrations occurring during normal operation of the jointer. These leveling pads significantly enhance the stability of the jointer 10 during use, particularly when the jointer is positioned on rough or uneven ground, thus further enhancing the stability and safety of the entire machine. Leveling pads 166, 168, 170, 172 can be positioned out of the way for transport of jointer 10 simply by rotating the shanks to raise the pads above the surface of the ground.

Second Embodiment

Figure 7:
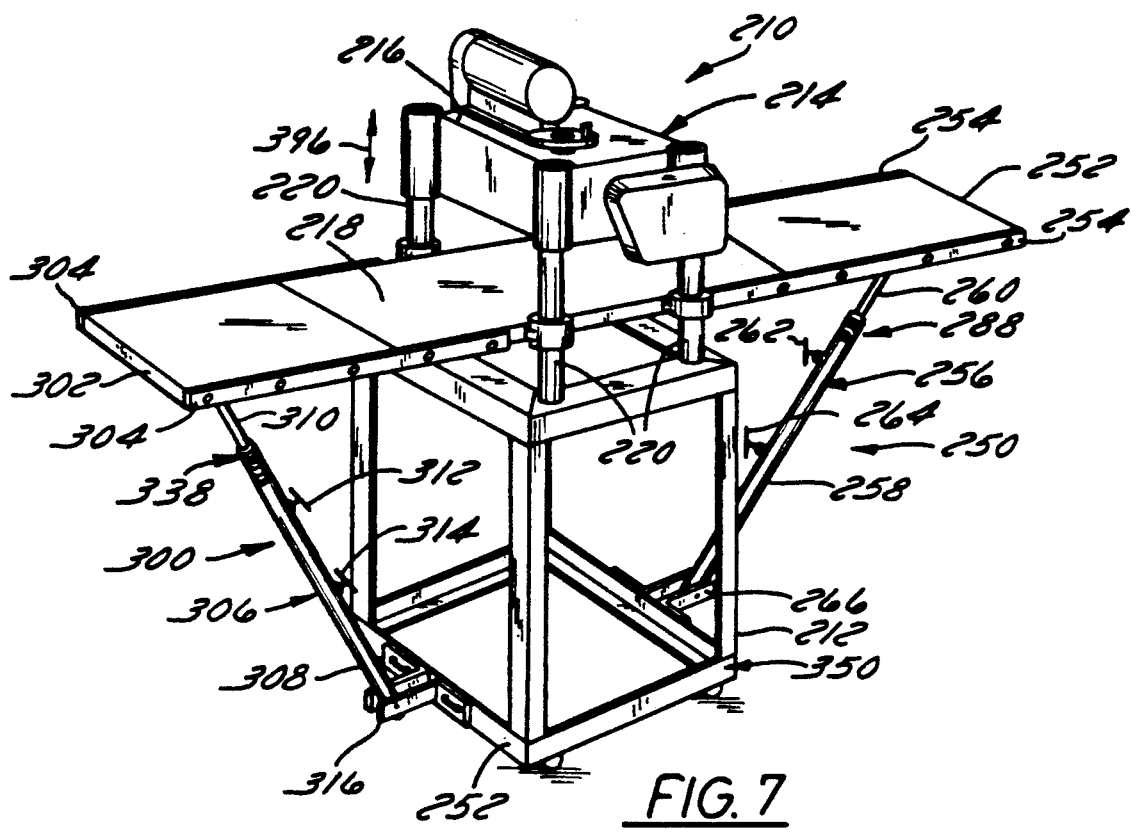
FIG. 7 is a perspective view of a second embodiment of the present invention having extension assemblies and a carriage with leveling assemblies mounted on a thickness planer.

Referring to FIG. 7, another embodiment of the invention is illustrated in which extension assemblies 250 and 300 are provided on a conventional thickness planer 210. This planer includes a pedestal frame 212 and a planer assembly 214 including a planing tool 216 and a support table 218 which are independently vertically adjustable on support posts 220. A carriage 350 is provided on the base of pedestal 212.

The extension assemblies 250 and 300 are essentially identical to the assemblies 50 and 100 discussed above and include respective infeed and outfeed tables 252 and 302, attached to respective ends of support table 218, and support elements 256 and 306 which are pivotally attached to the frame 352 of carriage 350 via support brackets 266 and 316 and to the undersides of tables 252 and 302 via brackets (not shown). The infeed and outfeed tables 252 and 302 are typically somewhat longer than the corresponding tables of FIGS. 1-6 because the support table 218 is relatively short when compared to the combined lengths of the tables 22 and 24 of FIGS. 1-6. In fact, each table 252 and 302 may be several feet long. This variation illustrates that the concept of the present invention can be varied to meet the requirements of virtually any application.

Extension elements 256, 306 include respective outer and inner telescoping tubes 258, 260 and 308, 310 and locking screws 262, 264 and 312, 314 which lock the inner and outer telescoping tubes together when tightened. Self-adjust mechanisms 288 and 338, identical in construction and operation to the mechanisms 88 and 138 of the previous embodiment, provide counterbalancing forces supporting the weights of tables 252, 302 upon vertical adjustment of support table 218. The infeed and outfeed tables 252 and 302 are fixed to support table 318 via rigid connecting bars 254, 304.

The extension assemblies 250, 300 function the same as the corresponding assemblies 50, 100 illustrated in FIGS. 1-6. Specifically, tables 252 and 302 move vertically with vertical movement of table 218 in the direction of arrow 396 against the force of the springs of self-adjust mechanisms 288, 338. During this movement, the support elements 256, 306 pivot about the respective support brackets and the tubes 258, 260 and 308, 310 move longitudinally relative to one another. Further discussion of the operation of the support assemblies 250, 300 will thus be omitted to avoid undue repetition.

The carriage 350 may also have levelling assemblies (not shown) provided on its frame 352 which are identical in construction and operation to the leveling assemblies 160, 162, 164, and 166 discussed above.

The support assemblies 250, 300, and particularly the outfeed support assembly 300, produce an additional advantage if provided on a thickness planer having driven infeed and outfeed serrated rollers (not shown). Such rollers are typically driven by the same motor which drives the planing blades and apply feeding or withdrawing forces to the boards being serviced by the machine. These forces are adjustable in a known manner by adjusting the tension on springs connected to the rollers.

Relatively long boards tend to rock as they are pulled off from the outfeed table of an unmodified thickness planer because they are not supported by the extension assembly 300 of the present invention and thus have significant portions of their lengths cantilevered off from the end of the machine when the planing operation is nearly complete. This rocking would cause the inner ends of the boards to bind or jam against the blades of the planer, thus requiring the imposition of relatively high driving forces by the outfeed roller to draw the boards off from the planer. These high forces, when applied by the serrated edges of the roller, often damage boards of soft wood, such as pine or butternut.

The present invention avoids or at least alleviates this problem by eliminating the binding effect produced by prior art devices by supporting all or nearly all of the weight of a board on a support surface at all times, thus preventing the rocking motion discussed above. Smaller forces are therefore required to draw boards off from the planer. Accordingly, the outfeed roller can be adjusted to apply smaller forces to the boards, and thus is less likely to damage the boards.

Third Embodiment

Figure 8:
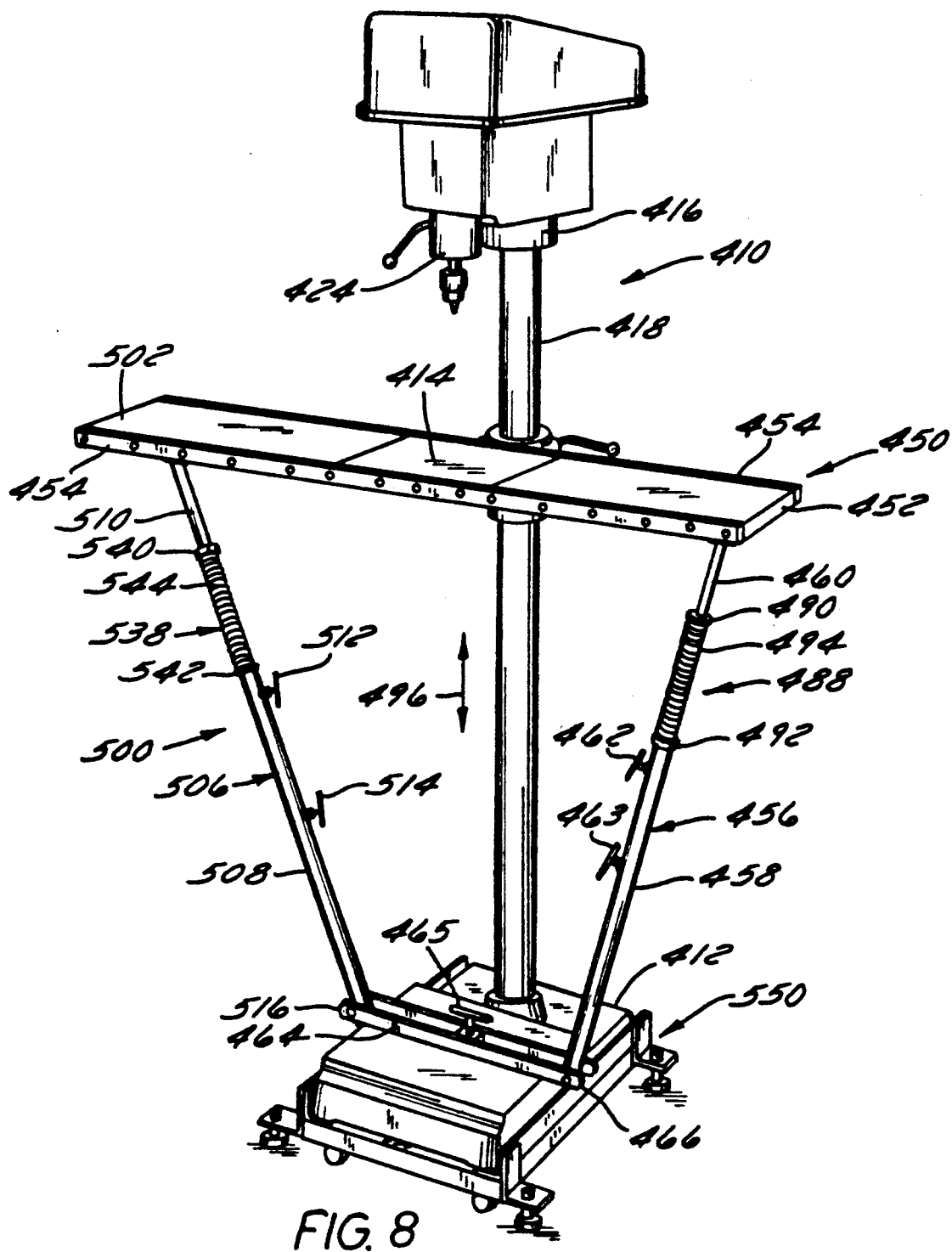
FIG. 8 is a perspective view of a third embodiment of the invention having extension assemblies mounted on a drill press.

Referring to FIG. 8, another embodiment of the invention is illustrated in which extension assemblies 450 and 500 are provided on a conventional drill press 410. Drill press 410 includes a base 412, and a support surface or table 414 and a head 416 which are slidably mounted on a post 418 via respective clamps. A drill 424 is mounted on head 416. Drill 424 and table 414 may pivot with respect to post 418 to permit drilling at various angles. If desired, a backstop (not shown) could be provided behind tables 414, 452, and 502 to facilitate positioning of the workpieces on the drill press.

Extension assemblies 450 and 500 include extension tables 452 and 502 attached to the longitudinal ends of support table 414 via rigid connecting bars 454 each extending along the length of tables 414, 452, and 502.

The cantilevered ends of the tables 452 and 502 are supported on the base 412 of drill press 410 via support elements 456, 506. Support elements 456, 506 include outer and inner telescoping tubes 458, 460 and 508, 510 lockable together via locking screws 462, 463 and 512, 514. The free ends of outer tubes 458, 508 are pivotally attached to opposed ends 466, and 516 of a mounting bracket 464 which is in turn secured to the base 412 of drill press 410 via a mounting screw 465. Mounting bracket 464 and extension assemblies 450 and 500 are pivotable about mounting screw 465 so as to permit pivoting of the extension assemblies with table 414. The free ends of inner tubes 460, 510 are pivotally connected to brackets affixed to the underside of tables 452 and 502.

Self-adjust mechanisms 488, 538 are provided on support elements 456, 506, each of which includes a collar 490, 540 provided on the respective inner tubes 460, 510, a washer 492, 542 provided on the respective outer tube 458, 508, and a spring 494, 544 surrounding the inner tube and abutting the respective collar and washer. The springs 494 and 544 of this embodiment are somewhat longer than those of the previous embodiments so as to permit greater vertical adjustment of tables 414, 452, and 502. These springs, like the springs of the previous embodiments, each have a spring constant which is directly related to the weight of the tables 414, 452, 502. The resistance provided by springs 494 and 544 should also remain constant throughout the stroke of the inner tubes.

The extension assemblies 450 and 500 function identically to those of the previous embodiments. Thus, in use, the self-adjust mechanisms 488 and 538 support the ends of the tables 452 and 502 when the locks 462 and 512 are loosened, and support elements 456 and 506 pivot and shorten against the action of spring 494, 544 upon downward movement of the tables 414, 452, and 502 in the direction of arrow 496 in FIG. 8. As in the previous embodiments, upward movement of tables 414, 452 and 502 is facilitated by the counterbalancing forces imposed by springs 494, 544.

A carriage assembly 550 and the associated leveling pads provide the same advantages discussed above in connection with the embodiments of FIGS. 1-7.

Many changes and modifications could be made to the present invention without departing from the spirit and scope thereof. Backup locking screws could be provided in addition to screws 462 and 512 to assure secure connections when the tubes of the support elements 456, 506 are locked together. Mounting bracket 464 could be replaced with any suitable device or devices providing a pivotable connection of the supporting elements 456, 506 to the base 412 of drill press 410. Extension assemblies according to the present invention could be provided on virtually any tool having an adjustable support surface, including band saws, scroll saws, etc.

I claim:

1. An apparatus comprising:
   (A) a machine including a frame, a base provided on said frame, a tool located above said base and connected to said frame, and a generally planar support surface located proximate said tool, said support surface being vertically adjustable;
   (B) a horizontally adjustable bracket connected to said base;
   (C) vertically adjustable leveling assemblies connected to said base; and
   (D) an extension assembly which includes
      (i) an extension table having opposed ends and a generally planar surface,
      (ii) a connector rigidly connecting one of said opposed ends of said extension table to said support surface such that said extension table extends generally coplanar with said support surface, (iii) a longitudinally adjustable support element having a first end pivotally connected to said bracket, a second end pivotally connected to said extension table between said opposed ends thereof, and a locking device which is actuatable to permit longitudinal adjustment of said support element upon motion of said support surface, and (iv) a self-adjust mechanism which is connected to said support element and which supports at least a portion of the weight of said extension table during adjustment of said support surface.

2. The apparatus according to claim 1, wherein said base has holes bored therethrough and wherein said bracket comprises a pair of L-shaped members each having a first leg extending coplanar with said frame and having a slot formed therein which is aligned with said holes in said base, and a second leg connected to said first leg and extending orthogonally to said frame, and wherein said second legs of said L-shaped members face one another and have means provided thereon for pivotally receiving said first end of said support element.

3. The apparatus according to claim 1, wherein said base has a threaded hole formed therein, and wherein each of said leveling assemblies comprises a bracket attached to said base, a threaded shank which engages said threaded hole in said base, and a leveling pad connected to said threaded shank.

4. The apparatus according to claim 1, wherein said support element comprises inner and outer telescoping tubes.

5. The apparatus according to claim 4, wherein said locking device comprises a threaded pin extending through said outer tube and selectively engaging said inner tube.

6. The apparatus according to claim 4, wherein said self-adjust mechanism comprises a spring biasing said inner and outer tubes apart from one another.

7. The apparatus according to claim 6, wherein said spring surrounds said inner tube.

8. The apparatus according to claim 1, wherein said connector comprises an elongated rigid plate having a first end fastened to said support surface and a second end fastened to said extension table.

9. The apparatus according to claim 1, wherein said tool comprises a jointer and said support surface comprises an infeed table, and wherein said infeed table is attached to said frame at a gib joint.

10. The apparatus according to claim 1, wherein said tool comprises one of a planer and a drill press.

11. The apparatus according to claim 10, wherein said extension assembly further comprises a strut which connects said support element to said frame, and which, when locked to said support element, prevents said support element from pivoting with respect to said frame, and a locking device which selectively locks said strut to said support element.

12. An extension assembly for increasing the effective length of an adjustable support surface of a machine including a frame, a base provided on said frame, a tool located above said base and connected to said frame, and said support surface, said extension assembly comprising:

(A) an extension table having opposed ends and a generally planar surface;

(B) a connector rigidly connecting one of said opposed ends of said extension table to said support surface such that said extension table extends generally coplanar with said support surface;

(C) a longitudinally adjustable support element having a first end connected to said base of said frame and a second end connected to said extension table between said first and second opposed ends thereof; and (D) a self-adjust mechanism which is connected to said support element and which supports at least a portion of the weight of said extension table during adjustment of said support element.

13. The apparatus according to claim 12, wherein said support element comprises inner and outer telescoping tubes.

14. The apparatus according to claim 13, wherein said self-adjust mechanism comprises a spring biasing said inner and outer tubes apart from one another.

15. The apparatus according to claim 14, wherein said spring surrounds said inner tube.

16. The apparatus according to claim 15, further comprising first and second supports which are provided on said inner and outer tubes, respectively, and which engage said spring.

17. The apparatus according to claim 12, wherein said connector comprises an elongated rigid bar having a first portion fastened to said support surface and a second portion fastened to said extension table.

18. A method of adjusting the height of a support surface of a machine, said machine including a frame, a base provided on said frame, a tool located above said base and fixed to said frame, and said support surface, said method comprising the steps of:

(A) loosening a locking device connecting mating sections of a longitudinally adjustable support element, said support element having a first end pivotally connected to said base and a second end pivotally connected to an extension table having opposed ends and a generally planar surface, one of said opposed ends of said extension table being rigidly connected to said support surface such that said extension table extends generally coplanar with said support surface;

(B) supporting at least a portion of the weight of said extension table on a self-adjust mechanism connected to said support table;

(C) adjusting the height of said support surface; and then (D) tightening said locking device.

19. The method according to claim 18, wherein said step (B) comprises supporting the weight of said extension table on a spring engaging inner and outer telescoping tubes forming said supporting element.

* * * * *